(12) United States Patent
Shin et al.

(10) Patent No.: US 7,366,262 B2
(45) Date of Patent: Apr. 29, 2008

(54) FREQUENCY ESTIMATION METHOD OF MB-OFDM UWB SYSTEM USING TIME FREQUENCY HOPPING STRATEGY

(75) Inventors: Cheol HO Shin, Taejon (KR); Sang sung Choi, Taejon (KR); Kwang Roh Park, Taejon (KR)

(73) Assignee: Electronics and Telecommunications Research Institute, Iaejon (KR)

( * ) Notice: Subject to any disclaimer, the term of this patent is extended or adjusted under 35 U.S.C. 154(b) by 570 days.

(21) Appl. No.: 11/023,382

(22) Filed: Dec. 29, 2004

(65) Prior Publication Data

US 2006/0083290 A1    Apr. 20, 2006

(30) Foreign Application Priority Data

Oct. 19, 2004    (KR) .................... 10-2004-0083749

(51) Int. Cl.
H04L 27/06    (2006.01)
(52) U.S. Cl. .................. 375/344; 375/131; 375/132; 375/260; 375/371; 375/147; 455/12.1
(58) Field of Classification Search ................ 375/344
See application file for complete search history.

(56) References Cited

U.S. PATENT DOCUMENTS

| | | | | |
|---|---|---|---|---|
| 5,943,606 | A * | 8/1999 | Kremm et al. ............ | 455/12.1 |
| 6,111,911 | A * | 8/2000 | Sanderford et al. ......... | 375/147 |
| 2003/0128790 | A1* | 7/2003 | Fifield ........................ | 375/371 |
| 2005/0008108 | A1* | 1/2005 | Peng .......................... | 375/344 |

FOREIGN PATENT DOCUMENTS

KR    1020030090389    11/2003

OTHER PUBLICATIONS

Andreas Miaoudakis, et al.; "Carrier Frequency Offset Estimation and Correction for Hiperlan/2WLANs"; Proceedings of the Seventh International Symposium on Computers and Communications (ISCC'02); 1503146/02; 2002 IEEE.*

(Continued)

*Primary Examiner*—Mohammed Ghayour
*Assistant Examiner*—Sonia J King
(74) *Attorney, Agent, or Firm*—Lowe Hauptman Ham & Berner LLP (57) ABSTRACT

A frequency estimation method of multiband (MB)-orthogonal frequency division multiplexing (OFDM) ultra wide band (UWB) system using an Alt-PHY time frequency (TF) hopping strategy based on IEEE 802. 15. 3a. includes the steps of: a) selecting a predetermined number of frequencies among a plurality of center frequencies based on a predetermined number of OFDM symbols and estimating relative frequency offsets for selected frequencies; b) obtaining an average relative frequency offset by averaging the estimated relative frequency offsets when two or more frequencies are selected at the step a); and c) obtaining real frequency offsets for each of the center frequencies by transforming the obtained average relative frequency offset to the real frequency offsets and compensating a frequency offset caused by a transmitting/receiving local oscillators based on the obtained real frequency offsets.

3 Claims, 7 Drawing Sheets

OTHER PUBLICATIONS

Paul H. MOose; "A Technique for Orthogonal Frequency Division Multiplexing Frequency Offset Correction"; IEEE Transactions on communications, vol. 42, No. 10, Oct. 10, 1994.*

Andreas Miaoudakis, et al.; "Carrier Frequency Offset Estimation and Correction for Hiperian/2 WLANs"; Proceedings of the Seventh International Symposium on Computers and Communications (ISCC'02); 15031346/02; 2002 IEEE.

Paul H. Moose; "A Technique for Orthogonal Frequency Division Multiplexing Frequency Offset Correction"; IEEE Transactions on Communications, vol. 42, No. 10, Oct. 10, 1994.

* cited by examiner

FREQUENCY ESTIMATION METHOD OF MB-OFDM UWB SYSTEM USING TIME FREQUENCY HOPPING STRATEGY

FIELD OF THE INVENTION

The present invention relates to a frequency estimation method of multiband (MB)—orthogonal frequency division multiplexing (OFDM) ultra wide band (UWB) system using a time frequency (TF) hopping strategy of IEEE 802. 15. 3a Alt-PHY, and more particularly, to a method for accurately estimating a frequency offset by using less number of orthogonal frequency division multiplexing (OFDM) symbols.

DESCRIPTION OF THE RELATED ART

An ultra wide band (UWB) system transmits signals across a much wider frequency than conventional system such as a narrow band system and a wideband system which is $3^{rd}$ generation of a cellular technology. The bandwidth of the UWB signals occupies at least 20% of center frequency or more than 0.5 GHz. An orthogonal frequency division multiplexing (OFDM) is a $4^{th}$ generation of a multiplexing technology. The OFDM prevents to refer a frequency which is not demodulator's own frequency by distributing data to a number of carrier waves which are apart from a predetermined frequency.

Figure 1:
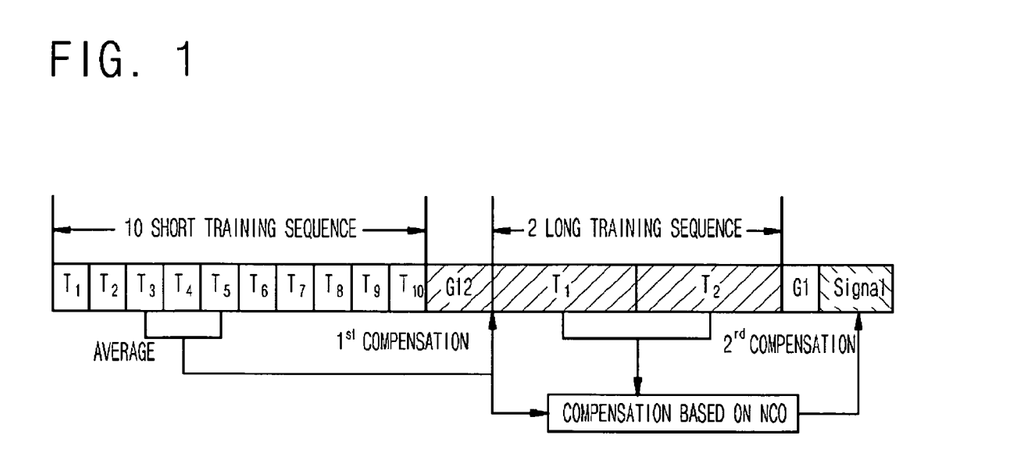
FIG. 1 is a diagram illustrating a preamble structure of a wireless local area network based on IEEE 802.11.a for explaining a $1^{st}$ and $2^{nd}$ frequency estimation and compensation method.

FIG. 1 is a diagram illustrating a preamble structure of a wireless local area network based on IEEE 802.11.a for explaining a $1^{st}$ and $2^{nd}$ frequency estimation and compensation method. The $1^{st}$ frequency estimation is performed within 10 short training sequences by using the preamble structure shown in FIG. 1 and a frequency offset is compensated by using a NCO. Also, the $2^{nd}$ frequency estimation and compensation is performed by using the 2 long training sequences.

A method for estimating a frequency offset by using repeated data symbols based on the maximum likelihood estimate (MLE) is proposed in an article entitled "A Technique for Orthogonal Frequency Division Multiplexing Frequency Offset Correction", IEEE Transactions on Communication, Vol. 42, No. 10, October 1994. The method estimates the frequency offset by using following equation.

$$\hat{\varepsilon} = (1/2\pi)\tan^{-1}\left\{\left(\sum_{k=-K}^{K} \text{Im}[Y_{2k}Y_{1k}^*]\right) \bigg/ \left(\sum_{k=-K}^{K} \text{Re}[Y_{2k}Y_{1k}^*]\right)\right\} \quad \text{Eq. 1}$$

Figure 2:
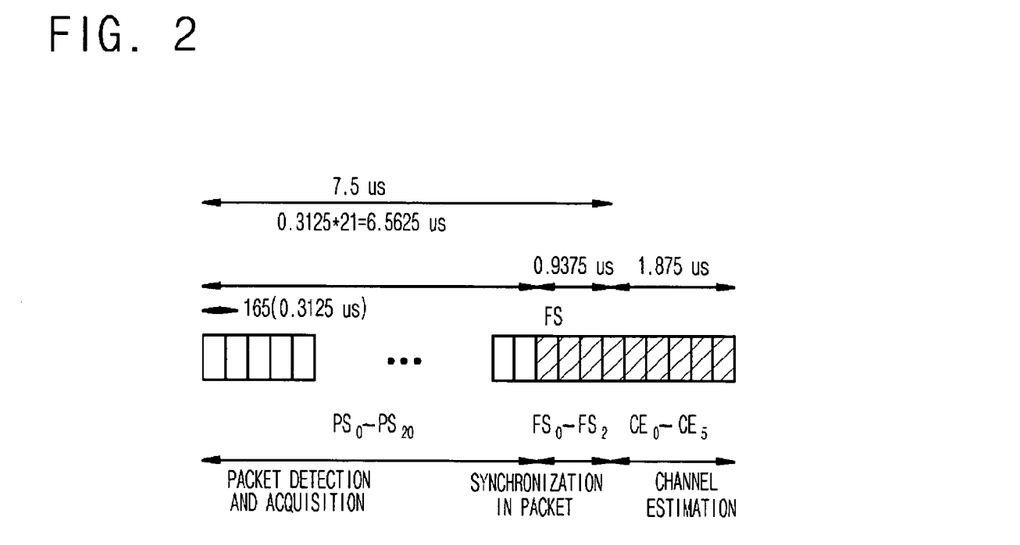
Figure 3:
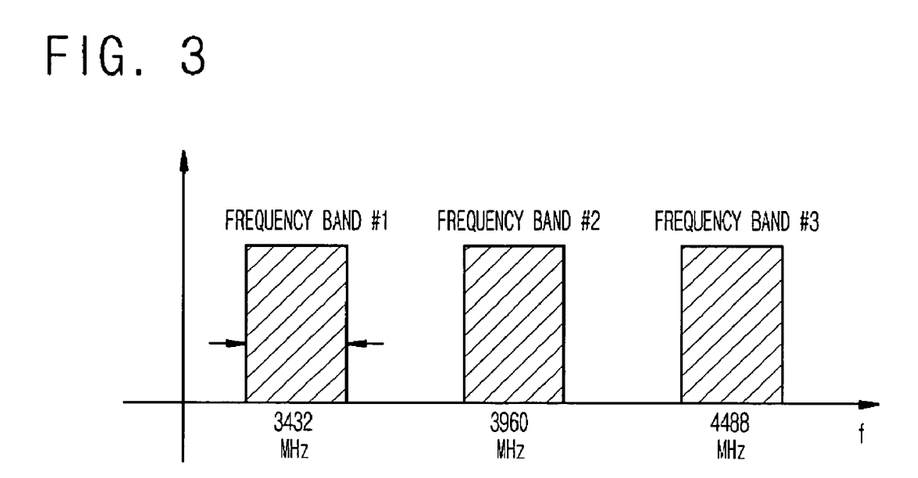
FIG. 3 shows three transmission frequency bands of a mode 1 used for a hopping in order to transmit symbols in a MB-OFDM UWB system.
Figure 5:
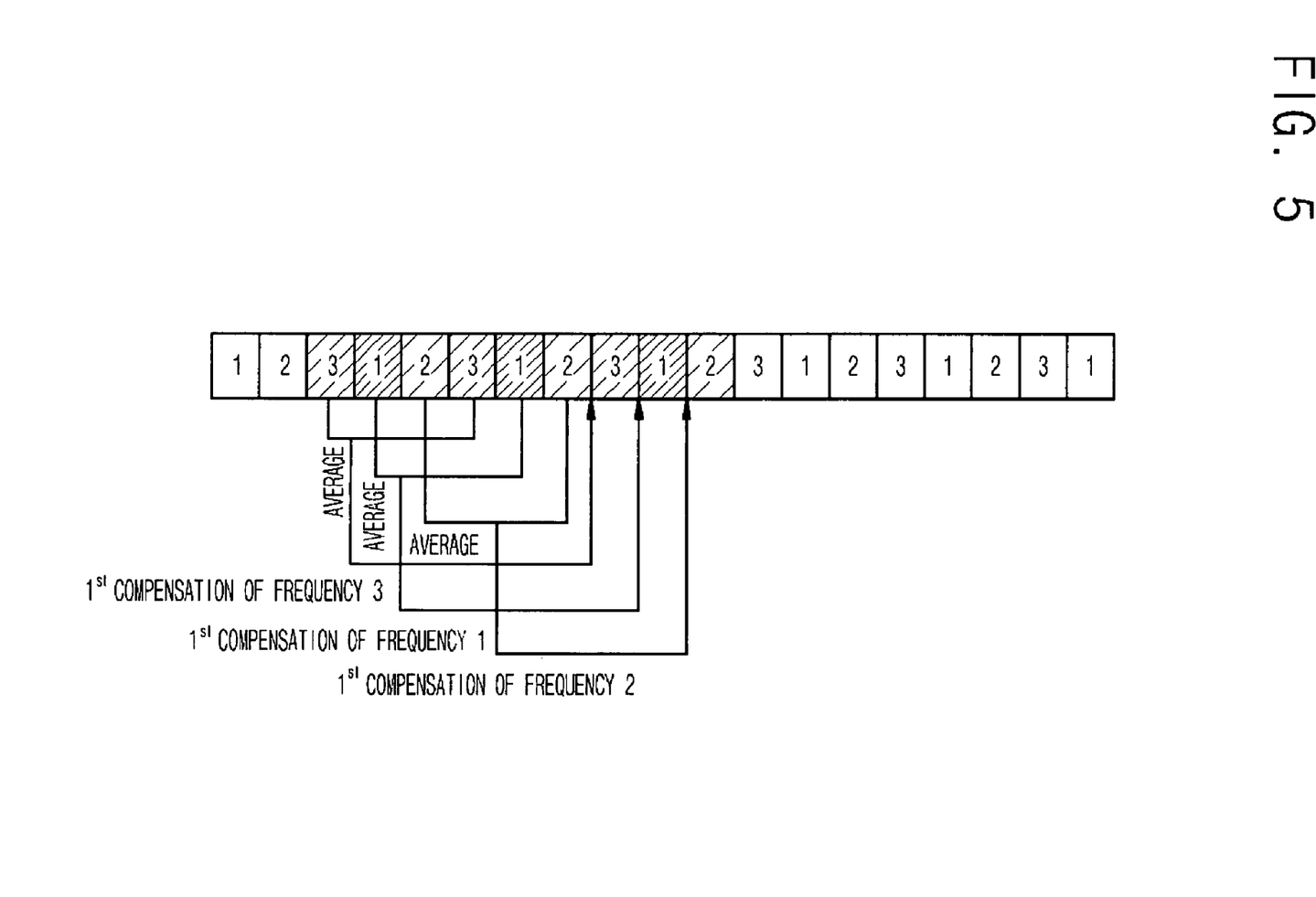
FIG. 5 is a diagram for explaining a conventional method for estimating and compensating a frequency offset of identical frequency band by using MB-OFDM UWB preamble symbols that timely hops three frequency bands by using the preamble patterns 1 or 2 in FIG. 4.
Figure 6:
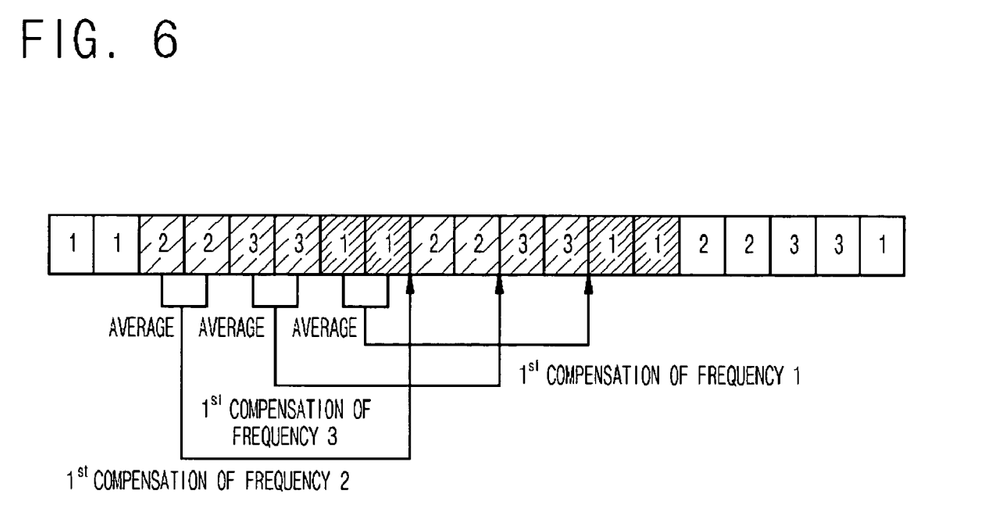
FIG. 6 is a diagram for explaining a conventional method for estimating and compensating a frequency offset of identical frequency band by using MB-OFDM UWB preamble symbols that timely hops three frequency bands by using the preamble patterns 3 or 4 in FIG. 4.

FIG. 2 is a diagram illustrating a preamble structure of mode 1 of MB-OFDM UWB system which is in progress of standardization in IEEE 802.15.3a Alt-PHY. As shown in FIG. 2, various algorithms including estimation of coarse/fine carrier frequency are performed within the preamble period. As referring to the FIG. 2, first 21 PS symbols having identical sign are transmitted and then 3 FS symbols are transmitted by converting the sign of the 3 FS symbols to be opposite comparing to 3 previously transmitted PS symbols. After transmitting the 3 FS symbols, 6 CE symbols having identical value are transmitted although 6 CE symbols are different from the 24 symbols. In case of transmitting 30 OFDM symbols in FIG. 2 in mode 1, 3 frequency bands are used as shown in FIG. 3 with one of 4 patterns in FIG. 4. Also, in case of estimating the frequency offset by using Eq. 1, the frequency offsets of frequency bands shown in FIGS. 5 and 6 are estimated based on the preamble pattern shown in FIG. 4, and symbols corresponding to each of center frequency bands are compensated. As mentioned above, the conventional method requires at least 6 OFDM symbols for estimating the frequency offset in case of using three frequency bands for transmitting the OFDM symbols. That is, the conventional method must obtain 6 OFDM symbols although other receiving algorithms need OFDM symbols in many preamble regions. The above mentioned drawback of the conventional method gets more serious in a mode 2 which estimates frequency offsets of 7 frequency bands.

SUMMARY OF THE INVENTION

Accordingly, the present invention is directed to a method for estimating a carrier frequency offset by using less number of OFDM symbols by estimating relative frequency offsets of a part of frequency bands and estimating real frequency offsets of remained part of frequency bandwidths excepting center frequency bands based on the estimated relative frequency offsets.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a frequency estimation method of multiband (MB)—orthogonal frequency division multiplexing (OFDM) ultra wide band (UWB) system using time frequency (TF) hopping strategy, the frequency estimation method including the steps of: a) selecting a predetermined number of frequencies among center frequencies based on a predetermined number of OFDM symbol and estimating relative frequency offsets for selected frequencies; b) obtaining an average relative frequency offset by averaging the estimated relative frequency offsets when two or more frequencies are selected at the step a); and c) obtaining real frequency offsets for each of the center frequencies by transforming the obtained average relative frequency offset to the real frequency offsets and compensating a frequency offset caused by a transmitting/receiving local oscillator based on the obtained real frequency offsets.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings:

FIG. 2 is a diagram illustrating a preamble structure of mode 1 of MB-OFDM UWB system which is in progress of standardization in Alt-PHY based on IEEE 802.15.3a;

DETAILED DESCRIPTION OF THE INVENTION

Reference will now be made in detail to the preferred embodiments of the present invention, examples of which are illustrated in the accompanying drawings.

A multiband (MB)—orthogonal frequency division multiplexing (OFDM) ultra wide band (UWB) system transmits orthogonal frequency division multiplexing (OFDM) symbols by using a plurality of center frequencies. For example, the MB-OFDM UWB system transmits OFDM symbols by using three center frequencies in a mode 1 and by using seven center frequencies in a mode 2. In the present invention, the frequency offset is estimated by using a fundamental principle that a frequency offset of a reference oscillator causes to generate a frequency offset of center frequency induced by difference between transmitting local oscillator (LO) and receiving local oscillator (LO), where the reference oscillator generates the center frequencies. Also, the present invention uses another principle that real frequency offset values of center frequencies are getting larger corresponding to the center frequency but relative frequency offset values of the center frequencies are identical at all frequency bands used for transmitting MB-OFDM symbols. Accordingly, the method of the present invention estimates a frequency offset by estimating the relative frequency offsets of the center frequencies instead of estimating the real frequency offsets of the center frequencies. That is, the method of the present invention can accurately estimate the frequency offset because a plenty of frequency bands are considered to estimate the frequency offset. Furthermore, the method of the present invention can estimate the real frequency offset values of frequency bands excepting the center frequencies by estimating single relative frequency offset of one frequency band.

In the method of the present invention, the relative frequency offset value is estimated by using following equation.

$$\Delta \hat{F}_{rc} = \frac{\left(\frac{1}{2\pi T}\tan^{-1}\left\{\frac{\sum_{n=0}^{N-1}\text{Im}\{y_{2n}y_{1n}^*\}}{\sum_{n=0}^{N-1}\text{Re}\{y_{2n}y_{1n}^*\}}\right\}\right)}{f_k} \quad \text{Eq. 2}$$

In Eq. 2, T represents a sample interval between symbols having identical center frequency, $Y_{2n}$ and $Y_{1n}$ are two consecutive time-domain symbols having identical center frequency, and $f_k$ is a center frequency of $K^{th}$ transmitted OFDM symbol.

Figure 4:
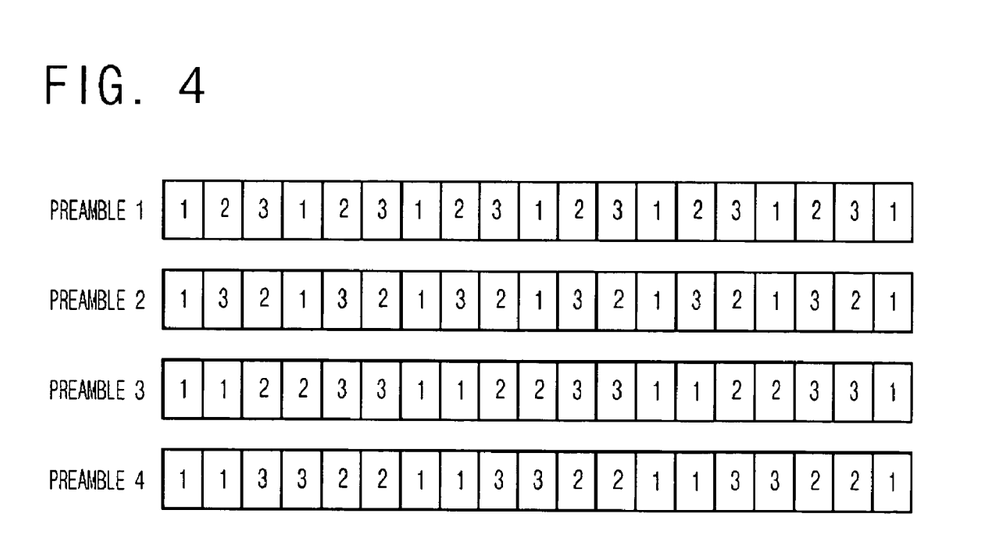
FIG. 4 shows four time frequency codes using three frequency bands of mode 1 for transmitting symbols in a MB-OFDM UWB system.

For example, in case of using a preamble pattern 1 shown in FIG. 4, the sample interval T is calculated by $3 \times 165 \times T_s$ because OFDM symbols transmitted with identical frequency is repeated within every three symbols, where the $T_s$ is a sampling time of the MB-OFDM UWB system.

In case that a frequency offset between transmitting/receiving LOs is 1 ppm, a real frequency offset is 1 KHz when a center frequency is 1 GHz and the frequency offset is 2 KHz when the center frequency is 2 GHz. That is, the real frequency offset is varied according to the center frequency. However, a relative frequency offset is always 1 ppm when the center frequency is 1 GHz or 2 GHz.

The method for estimating a frequency offset in accordance with the present invention will be explained by referring to FIG. 7 hereinafter.

Figure 7:
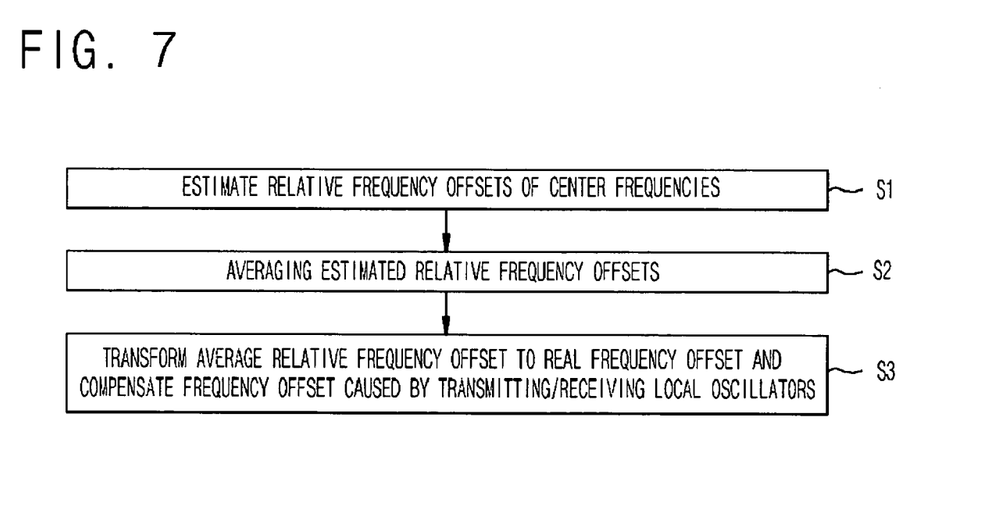
FIG. 7 is a flowchart showing a frequency estimation method in accordance with the present invention.

FIG. 7 is a flowchart showing a frequency estimation method by using a time frequency (TF) hopping strategy in a MB-OFDM UWB system in accordance with a preferred embodiment of the present invention.

As shown in FIG. 7, all or a predetermined number of center frequencies are selected and relative frequency offsets of selected center frequencies are estimated by using Eq. 2 at step S1. An average relative frequency offset is obtained by averaging the estimated relative frequency offsets when two or more center frequencies are selected at step S2. After obtaining the average relative frequency offset, the average frequency offset is transformed to a real frequency offset of each center frequency by using Eq. 3 and the frequency offset caused by transmitting/receiving LOs is compensated at step S3.

$$\Delta \hat{F}_c = \Delta \hat{F}_{rc} * f_k \quad \text{Eq. 3}$$

Figure 8:
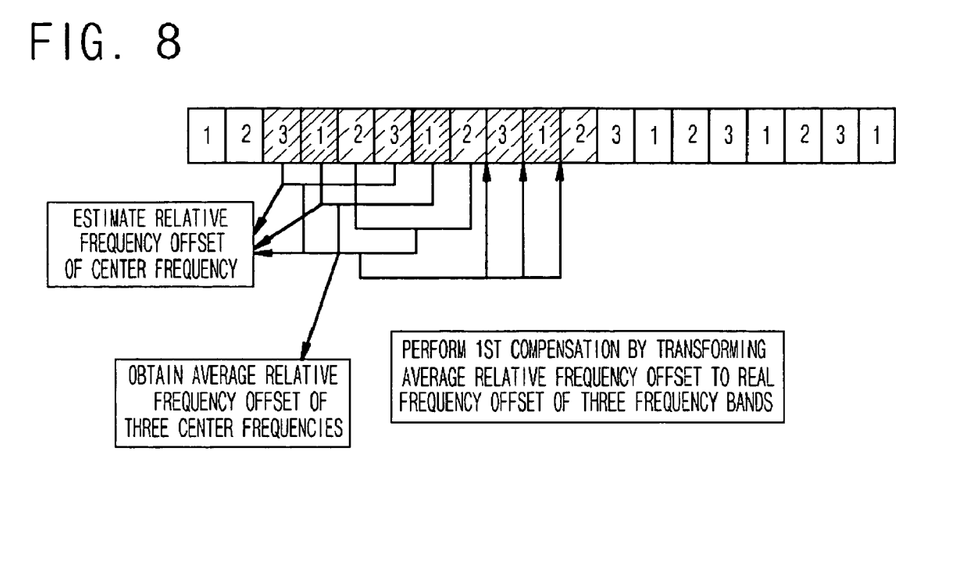
FIG. 8 is a view showing a frequency estimation method in accordance with a preferred embodiment of the present invention.

FIG. 8 is a diagram showing compensation of the frequency offset caused by transmitting/receiving LOs by estimating the relative frequency offset of each center frequency, obtaining the average relative frequency offset and obtaining the real frequency offset of each center frequency based on the obtained average relative frequency offset.

Figure 9:
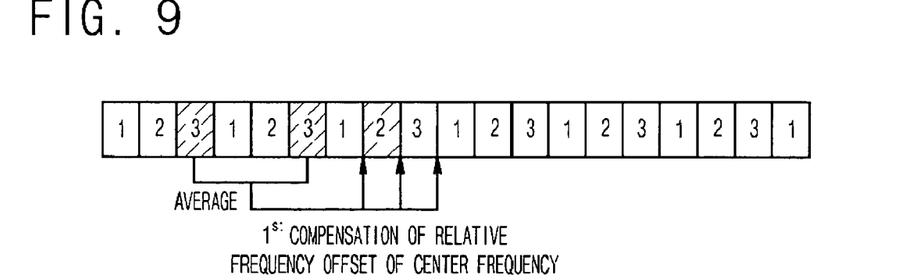
FIG. 9 is a view showing a frequency estimation method in accordance with a preferred embodiment of the present invention.
Figure 10:
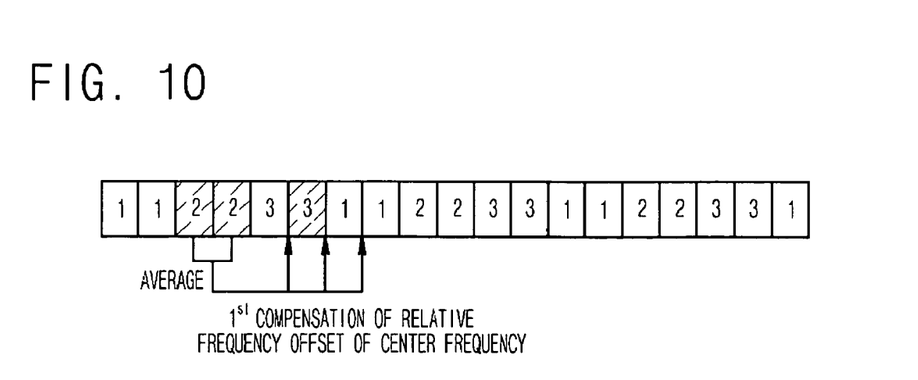
FIG. 10 is a view showing a frequency estimation method in accordance with a preferred embodiment of the present invention.

FIGS. 9 and 10 show estimation of a relative frequency offset by selecting one center frequency among three center frequencies in accordance with a preferred embodiment of the present invention.

As shown in the FIG. 9, single relative frequency offset is estimated by selecting one center frequency among three frequencies when OFDM symbols are transmitted by using a preamble pattern 1 or a preamble pattern 2. After estimating, the estimated single relative frequency offset is transformed to real frequency offsets of the three center frequencies and the frequency offset is compensated by using the real frequency offsets. That is, one center frequency is selected among three center frequencies (based on mode 1) and single relative frequency offset of one selected center frequency is estimated at step S1 in FIG. 7. During estimating the relative frequency offset, only four OFDM symbols are required to estimate the frequency offset.

As shown in FIG. 10, single relative frequency offset is estimated by selecting one center frequency among three frequencies when OFDM symbols are transmitted by using a preamble pattern 3 or a preamble pattern 4. During estimating the relative frequency offset, only three OFDM symbols are required to estimate the frequency offset.

Figure 11:
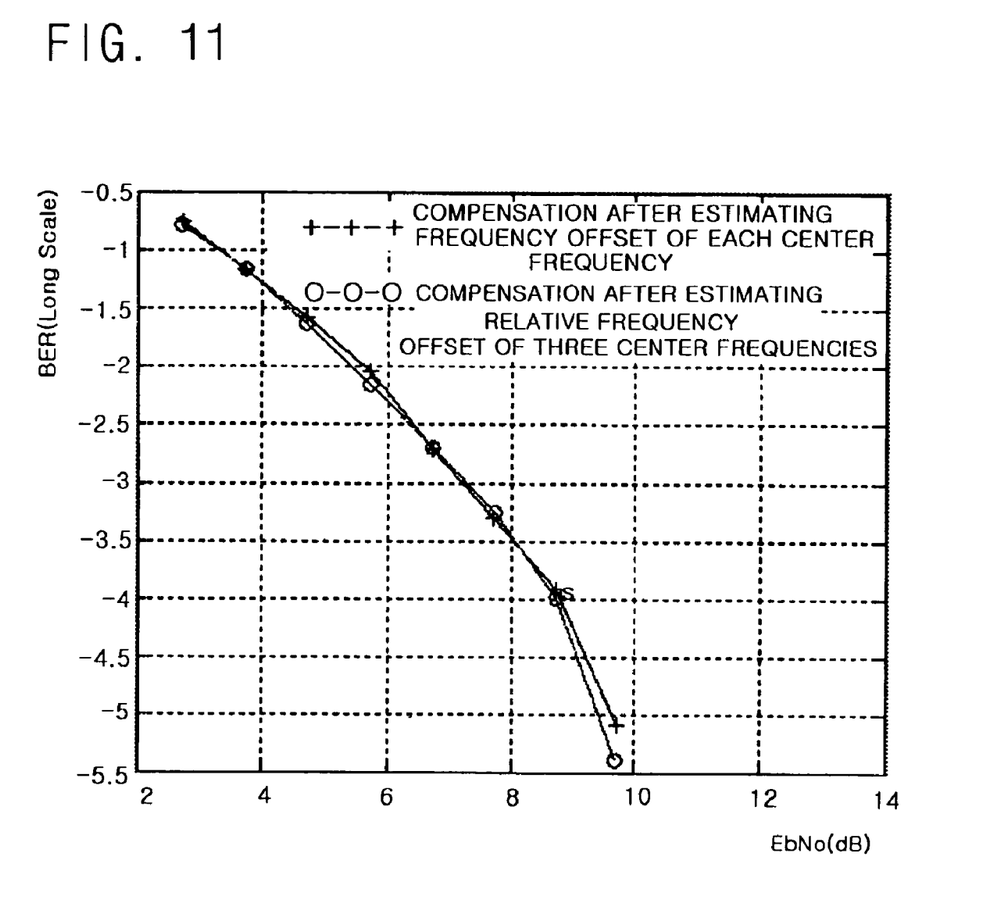
FIG. 11 is a graph showing a result of performance analysis of the present invention using an average of frequency offsets.

FIG. 11 is a graph showing performances of the present invention and a related art for compensating a frequency offset. In FIG. 11, a curve with small circles represents the performance of the present invention and another curve with plus sings represents the performance of the related art. That is, the curve with small circles shows the performance of the present invention in case of compensating a frequency offset by estimating an average relative frequency offset for three center frequencies and other curve with plus signs shows the performance of the related art which compensates the frequency offset by obtaining real frequency offsets for each of center frequencies. As shown, performances of the present invention and the related art are almost identical.

Figure 12:
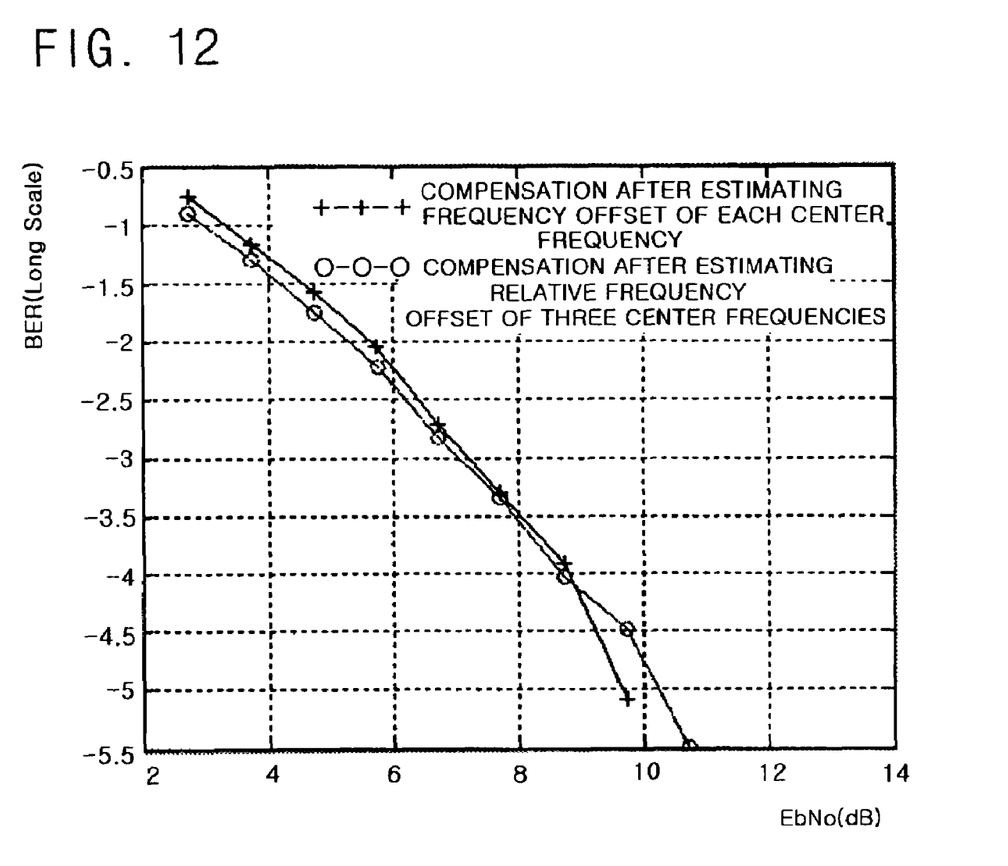
FIG. 12 is a graph showing a result of performance analysis of the present invention using an average of frequency offsets.

FIG. 12 is another graph showing performances of the present invention and a related art for compensating a frequency offset. In FIG. 12, a curve with small circles represents the performance of the present invention in case of compensating a frequency offset by estimating single relative frequency offset for one center frequency and another curve with plus signs represents the performance of the related art which compensates the frequency offset by obtaining real frequency offsets for each of center frequencies. As shown, there is less than 1 dB performance difference based on $10^{-5}$ between the performance of the present invention and the performance of the related art.

In FIGS. 8 to 12, the mode 1 using three frequency bands is used as an example for explaining the preferred embodiment of the present invention. However, the present invention can be implemented in the mode 2 using seven frequency bands.

The frequency estimation method by using TF hopping strategy of MB-OFDM UWB system can be implemented as a set of computer executable instructions and it can be stored in a computer readable recoding medium including a hard disk, a floppy disk, an optical magnetic disk, a CD-ROM, a ROM and a RAM.

As mentioned above, the frequency estimation method of the present invention estimates a frequency offset between transmitting/receiving Los by estimating relative frequency offsets of OFDM symbols transmitted with different frequencies according to a preamble pattern in MB-OFDM UWB system using TF hopping strategy of IEEE 802. 15. 3a Alt-PHY. Accordingly, the present invention can accurately estimate the frequency offset comparing to a conventional method estimating frequency offsets of each of center frequencies.

Also, the present invention estimates a frequency offset by selecting a predetermined number of center frequencies and estimating relative frequency offsets of selected center frequencies. Therefore, comparative small number of OFDM symbols is required to estimate the frequency offset without performance degradation comparing to a related art. Furthermore, other receiving algorithms can be easily implemented since there are sufficient OFDM symbols remained after estimating the frequency offset.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A frequency estimation method of a multiband (MB)— orthogonal frequency division multiplexing (OFDM) ultra wide band (UWB) system using time frequency (TF) hopping strategy, wherein the frequency estimation method estimates a relative frequency offset for a center frequency $f_k$ by using the following equation:

$$\Delta \hat{F}_{rc} = \frac{\left( \frac{1}{2\pi T} \tan^{-1} \left\{ \frac{\sum_{n=0}^{N-1} \text{Im}\{y_{2n} y_{1n}^*\}}{\sum_{n=0}^{N-1} \text{Re}\{y_{2n} y_{1n}^*\}} \right\} \right)}{f_k},$$

wherein,

T represents a sample interval between OFDM symbols having the same center frequency at $f_k$, $y_{2n}$ and $y^*_{1n}$ are two consecutive time-domain OFDM symbols having the same center frequency at $f_k$, and $f_k$ is a center frequency of $K^{th}$ transmitted OFDM symbol.

2. A frequency estimation method of a multiband (MB)— orthogonal frequency division multiplexing (OFDM) ultra wide band (UWB) system using time frequency (TF) hopping strategy, the frequency estimation method comprising the steps of:

a) estimating relative frequency offsets each for one of a plurality of different center frequencies;

b) obtaining a single average relative frequency offset by averaging the estimated relative frequency offsets; and c) obtaining a plurality of real frequency offsets each for one of the center frequencies by transforming the obtained single average relative frequency offset to the real frequency offsets and compensating for a frequency offset caused by a transmitting/receiving local oscillator based on the obtained real frequency offsets;

wherein the relative frequency offset for a center frequency $f_k$ is estimated in step a) by using the following equation:

$$\Delta \hat{F}_{rc} = \frac{\left( \frac{1}{2\pi T} \tan^{-1} \left\{ \frac{\sum_{n=0}^{N-1} \text{Im}\{y_{2n} y_{1n}^*\}}{\sum_{n=0}^{N-1} \text{Re}\{y_{2n} y_{1n}^*\}} \right\} \right)}{f_k},$$

wherein,

T represents a sample interval between OFDM symbols having the same center frequency at $f_k$, $y_{2n}$ and $y^*_{1n}$ are two consecutive time-domain OFDM symbols having the same center frequency at $f_k$, and $f_k$ is the center frequency of the $k^{th}$ transmitted OFDM symbol.

3. A frequency estimation method of a multiband (MB)—orthogonal frequency division multiplexing (OFDM) ultra wide band (UWB) system using time frequency (TF) hopping strategy, the frequency estimation method comprising the steps of:

a) selecting a predetermined number of center frequencies among a plurality of different center frequencies based on a predetermined number of OFDM symbols and estimating relative frequency offsets each for one of the selected center frequencies;

b) obtaining a single average relative frequency offset by averaging the estimated relative frequency offsets when two or more center frequencies are selected at the step a); and c) obtaining a plurality of real frequency offsets each for one of the plurality of center frequencies by transforming the obtained single average relative frequency offset to the real frequency offsets and compensating for a frequency offset caused by a transmitting/receiving local oscillator based on the obtained real frequency offsets;

wherein the relative frequency offset for a center frequency $f_k$ is estimated in step a) by using the following equation:

$$\Delta \hat{F}_{rc} = \frac{\left( \frac{1}{2\pi T} \tan^{-1} \left( \frac{\sum_{n=0}^{N-1} \text{Im}\{y_{2n} y_{1n}^*\}}{\sum_{n=0}^{N-1} \text{Re}\{y_{2n} y_{1n}^*\}} \right) \right)}{f_k},$$

wherein,

T represents a sample interval between OFDM symbols having the same center frequency at $f_k$, $y_{2n}$ and $y^*_{1n}$ are two consecutive time-domain OFDM symbols having the same center frequency at $f_k$, and $f_k$ is the center frequency of the $k^{th}$ transmitted OFDM symbol.

* * * * *